United States Patent
Cholewczynski

(10) Patent No.: US 6,827,056 B2
(45) Date of Patent: Dec. 7, 2004

(54) VIBRATION FRICTION DAMPER

(75) Inventor: Ludwik Cholewczynski, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/342,074

(22) Filed: Jan. 14, 2003

(65) Prior Publication Data

US 2004/0134456 A1 Jul. 15, 2004

(51) Int. Cl.$^7$ .............................................. F02B 75/06
(52) U.S. Cl. ................................. 123/192.1; 123/192.2
(58) Field of Search ................................. 123/192.1

(56) References Cited

U.S. PATENT DOCUMENTS

| | | | |
|---|---|---|---|
| 4,703,725 A | | 11/1987 | Weertman |
| 5,214,975 A | | 6/1993 | Zalewski |
| 5,303,681 A | * | 4/1994 | Crofts ............ 123/192.1 |
| 5,720,248 A | * | 2/1998 | Crofts ............ 123/192.1 |
| 5,931,052 A | * | 8/1999 | Zhao et al. ............ 74/574 |
| 6,170,453 B1 | | 1/2001 | Killion |
| 6,283,076 B1 | * | 9/2001 | Simpson ............ 123/90.31 |
| 6,427,656 B1 | * | 8/2002 | Drecq et al. ............ 123/192.1 |
| 6,675,759 B2 | * | 1/2004 | Johnson et al. ............ 123/192.1 |

FOREIGN PATENT DOCUMENTS

WO  WO 00/00726  1/2000

OTHER PUBLICATIONS

"Metaldyne Awarded Contract with Nissan to Supply Advanced Engine Balance Shaft Modules", PR Newswire (Aug. 21, 2001).
"Newly developed AZ Series Engine", Hiroshi Hosoi, et al., SAE 2000–01–0327, Copyright 2000.

* cited by examiner

Primary Examiner—Henry C. Yuen
Assistant Examiner—Jason Benton
(74) Attorney, Agent, or Firm—Ralph E. Smith

(57) ABSTRACT

A vibration damper includes a crankshaft drive sprocket, a bearing, a friction module, and at least one bumper. The bearing is seated directly upon the crankshaft of the engine and receives the vibrations of the crankshaft. Bosses of the bearing are received within the well of the drive sprocket. Specifically, the bosses are seated within gaps formed within the well by bumpers, which are also seated within the well. The gear is seated upon the raised collar of the bearing and held in secure contact with the bearing by a wave spring. A friction ring is located between the bearing and the drive sprocket. The friction ring dampens the vibrations transferred between the bearing and the drive sprocket.

12 Claims, 3 Drawing Sheets

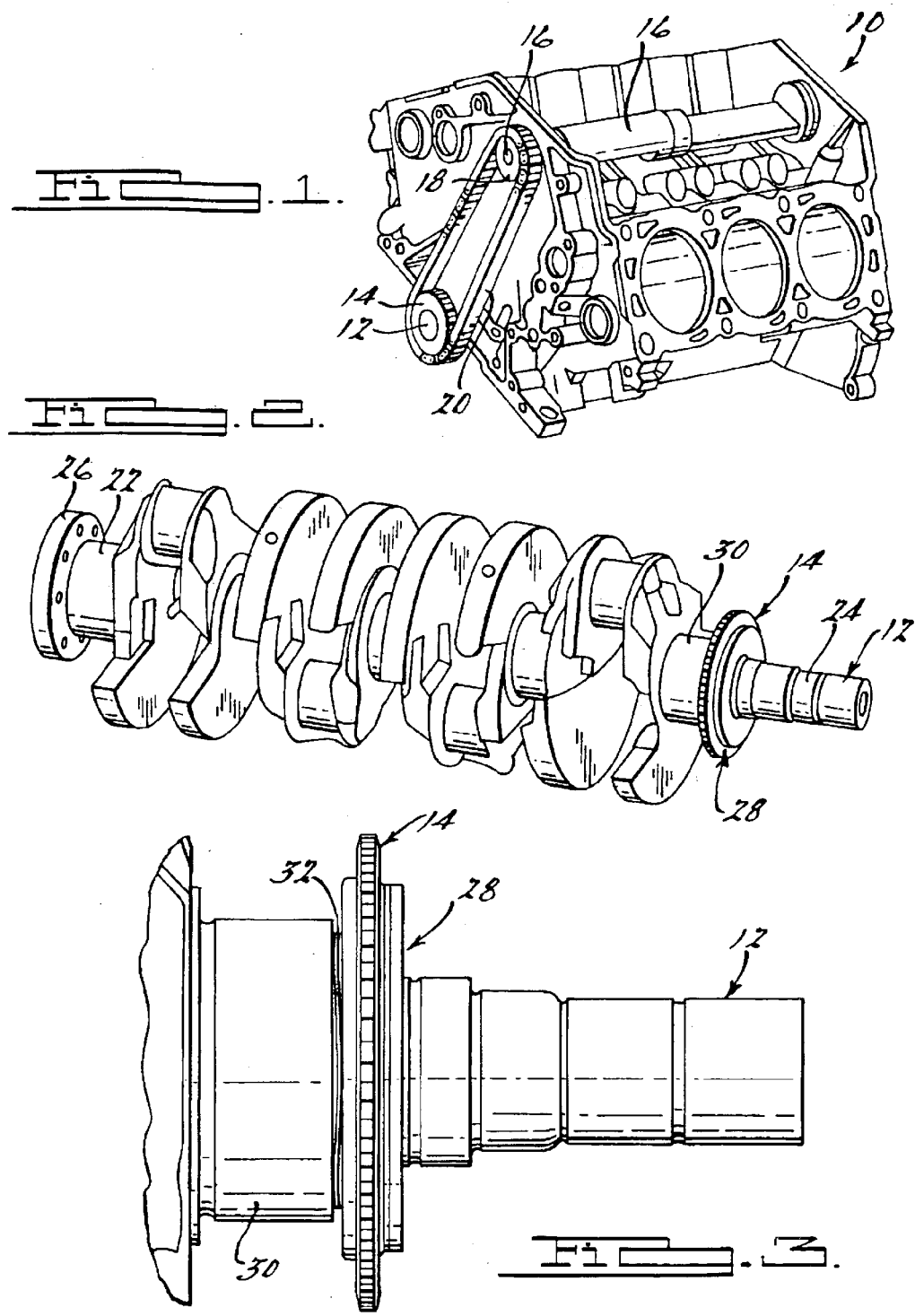

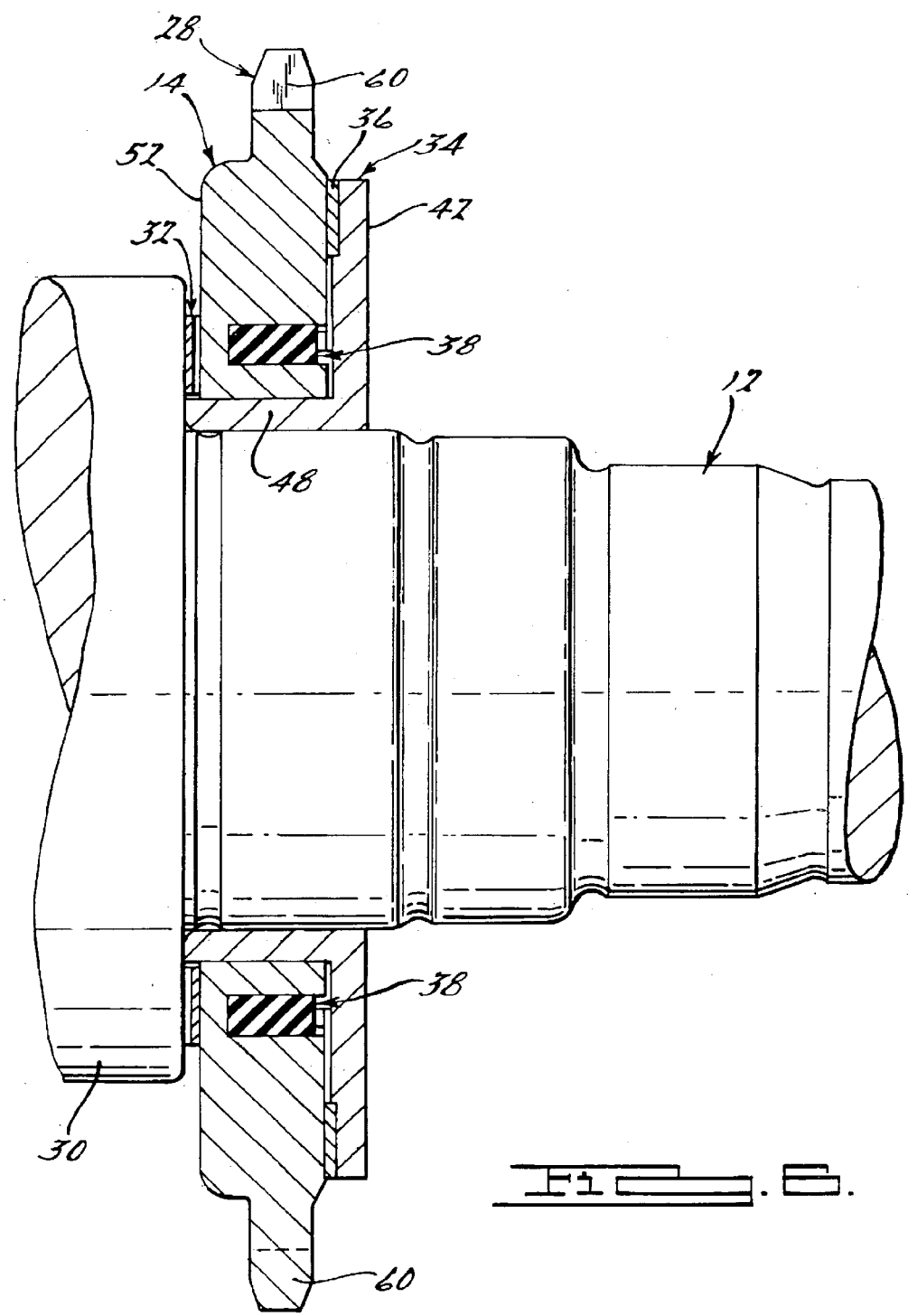

US 6,827,056 B2

VIBRATION FRICTION DAMPER

FIELD OF THE INVENTION

The present invention generally relates to a vibration damping device. More particularly, the present invention relates to a torsional vibration damping device for use in automobile engines.

BACKGROUND OF THE INVENTION

Various types of vibration dampers have been, and continue to be, used in motor vehicle applications for suppressing vibrations that occur in transmission systems. In particular, vibration damping or absorbing devices are commonly used to obviate the transfer of torsional vibrations from the crankshaft, typically produced by system resonance or misfiring, to the balance shaft of a motor vehicle transmission system. Such a damping device is intended to prevent the balance system from being overloaded by isolating the balance shaft from the torsional vibrations of the crankshaft. The transfer of a high load from the crankshaft to the balance shaft is undesirable as it is often the source of premature wear-out or failure of the chain, chain guides, or gears between the shafts.

While current vibration dampers are suitable for their intended use, there is a need for an improved vibration damper that prevents the torsional vibrations experienced in a motor vehicle crankshaft from being transferred to a motor vehicle balance system.

SUMMARY OF THE INVENTION

The present invention provides for an improved vibration damping device for suppressing the transfer of motor vehicle engine vibrations from a crankshaft of the engine to a balance system of the engine. The device is generally comprised of a bearing, a drive sprocket/gear, and a friction ring. The bearing is comprised of a plurality of bosses and is seated upon the crankshaft. The drive sprocket/gear is seated upon the bearing and generally includes a well disposed within the bearing and a plurality of bumpers disposed within the well. The drive sprocket/gear and the bearing are positioned in close contact with each other such that the bosses are seated within the well between the bumpers. The friction ring is positioned between the drive sprocket/gear and the bumpers. The transfer of engine vibrations from the bearing to the drive sprocket/gear and the balance shaft is minimized by the friction ring and the bumpers.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of an exemplary automobile engine having a crankshaft and a balance shaft connected by a balance shaft chain;

FIG. 2 is a perspective view of the crankshaft of the engine of FIG. 1, the crankshaft equipped with a vibration damper in accordance with one preferred embodiment of the present invention;

FIG. 3 is a side view of the vibration damper of FIG. 2 seated upon the crankshaft of FIG. 2;

FIG. 6 is a cross-sectional view of the vibration damper on the crankshaft as illustrated in FIG. 3.

DETAILED DESCRIPTION OF THE PREFERRED EMBODIMENTS

Figure 4:
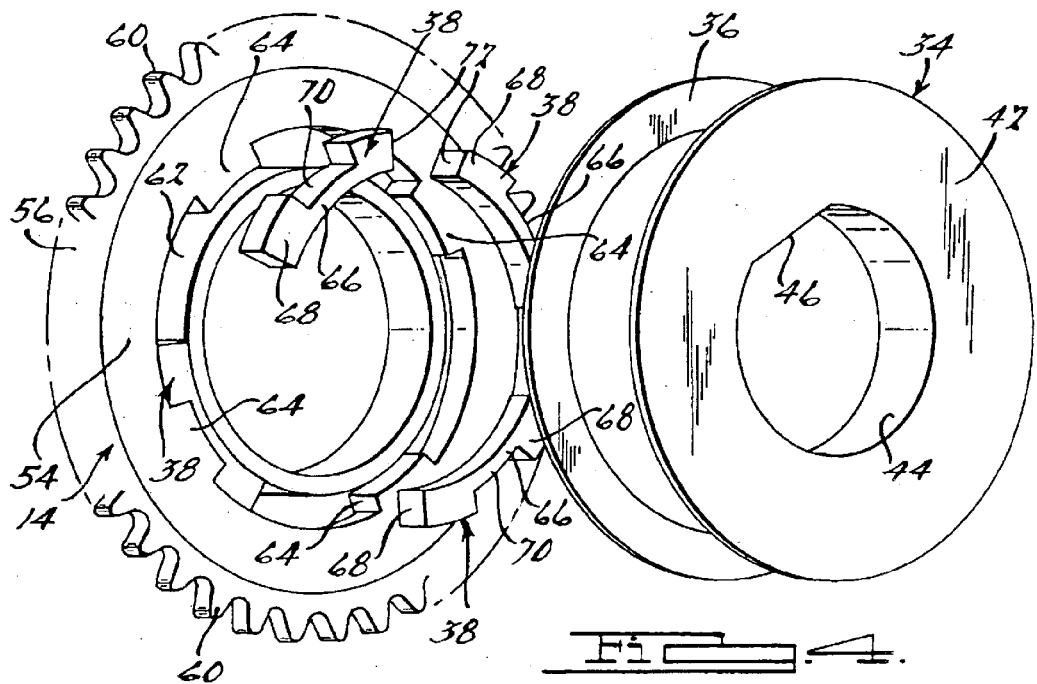
FIG. 4 is an exploded view of the vibration damper of FIG. 2 taken from a first side.

The following description of the preferred embodiments is merely exemplary in nature and is in no way intended to limit the invention, its application, or uses.

Referring now to the drawings and more particularly to FIG. 1, a motor vehicle engine 10 is shown. The motor vehicle engine 10 generally includes a crankshaft 12, a crankshaft drive sprocket 14, a balance shaft 16, and a balance shaft gear 18. While the engine 10 is illustrated as having a drive sprocket 14 of a chain drive system, it must be realized that the drive sprocket 14 may also be a gear of a cars drive system. The crankshaft 12 is an elongated shaft that serves to convert the reciprocating motion of the engine pistons into rotary motion. The entire power output of the engine 10 is transferred through rotation of the crankshaft 12. Thus, the crankshaft 12 is subject to numerous different forces that tend to twist the crankshaft 12 and cause the crankshaft 12 to vibrate. Power is transferred from the crankshaft 12 to the balance shaft 16 by way of the crankshaft drive sprocket/gear 14 which is seated upon the crankshaft 12.

The balance shaft 16 is an elongated shaft that rotates and vibrates in such a way to reduce or cancel some of the vibrations caused by the crankshaft 12. Rotation of the balance shaft 16 may be effectuated in numerous different ways but is preferably effectuated by the crankshaft 12. The torque of the crankshaft 12 may be transferred to the balance shaft 16 in any suitable manner but is typically transferred through the use of one or more chains, such as a balance shaft chain 20. As illustrated in FIG. 1, chain 20 directly links the crankshaft 12 to the balance shaft 16 through cooperation between the crankshaft drive sprocket/gear 14 and the balance shaft gear 18.

As seen in FIG. 2, the crankshaft 12 generally includes a first end 22 and a second end 24. The first end 22 preferably includes a flywheel 26. The second end 24 includes a balance shaft vibration damper assembly 28. The vibration damper assembly 28 minimizes the transfer of torsional vibration forces between the crankshaft 12, the balance shaft 16, and any other device coupled to the crankshaft 12 via the drive sprocket/gear 14. The vibration damper assembly 28 is disposed on the crankshaft 12 and abuts a crankshaft shoulder 30 (FIGS. 2 and 3).

A suitable biasing device, such as a wave spring 32 (FIGS. 3 and 5), is seated upon the crankshaft 12 between the shoulder 30 and the vibration damper assembly 28 to provide a biasing force between the shoulder 30 and the vibration damper assembly 28. The wave spring 32 is generally cylindrical and has a center through bore 33 for receipt of the crankshaft 12. The wave spring 32 is shaped to include a series of crests 35 and troughs 37 that provide the wave spring 32 with its biasing properties.

Figure 5:
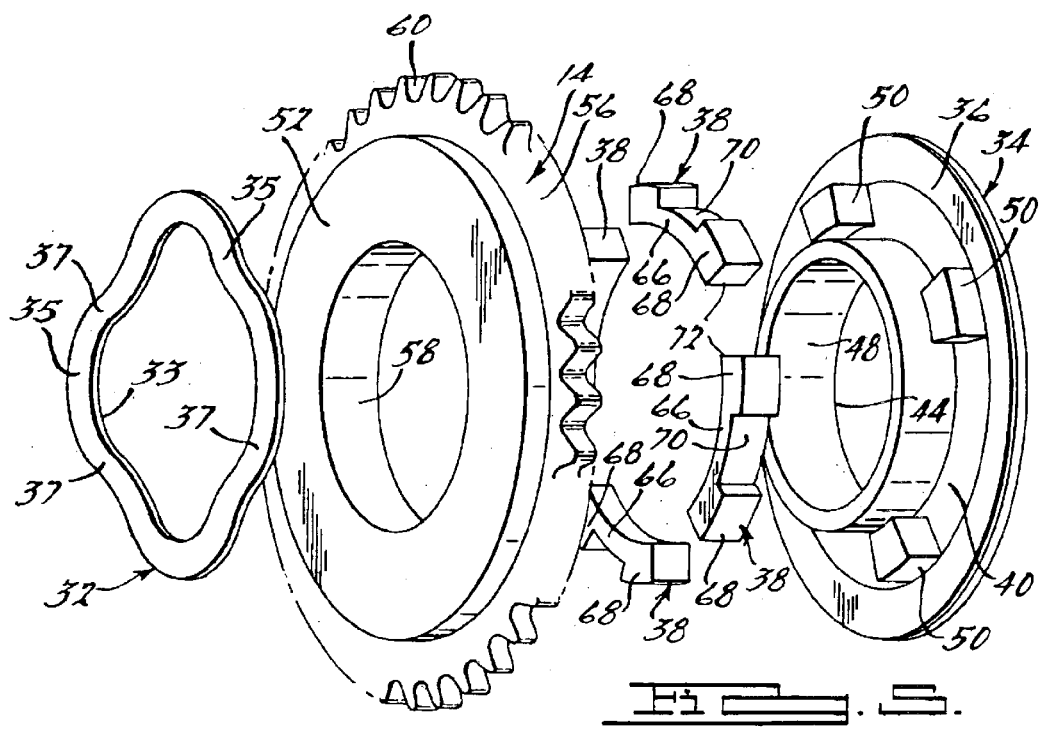
FIG. 5 is an exploded view of the vibration damper of FIG. 2 taken from a second side.

With reference to FIGS. 4 through 6, the vibration damper assembly 28 will now be described in greater detail. The vibration damper assembly 28 is generally comprised of the crankshaft drive sprocket/gear 14, a bearing 34, a friction ring 36, and at least one bumper 38.

The bearing 34 is a generally cylindrical member having a first face 40 and a second face 42. Extending through the first face 40 and the second face 42 is a center aperture 44. The center aperture 44 receives the crankshaft 12. The center aperture 44 includes a portion that is machined flat to create a tab 46. The tab 46 cooperates with a corresponding flat (not specifically shown) located upon the crankshaft 12 to insure that the bearing 34 maintains its proper position upon the crankshaft 12.

Extending from the first face 40 and surrounding the aperture 44 is an axially extending collar 48. The collar 48 supports the bearing 34 upon the crankshaft 12. Also extending from the first face 40 is a series of raised portions, preferably in the form of bosses 50. The first face 40 preferably includes four bosses 50 spaced evenly (90° intervals) about the first face 40. The bosses 50 cooperate with the drive sprocket/gear 14. The interaction between the drive sprocket/gear 14 and the bosses 50 is described in further detail below.

The friction ring 36 is secured about a periphery of the first face 40 of the bearing 34. The friction ring 36 may be secured to the first face 40 in any suitable manner, such as through the use of a suitable adhesive. The friction ring 36 may be made of any suitable material that is capable of reducing the transfer of vibrational forces between the bearing 34 and the drive sprocket/gear 14.

The gear 14 generally includes a first side 52, a second side 54, a peripheral edge 56, and a through bore 58 extending through the first side 52 and the second side 54. The peripheral edge 56 is comprised of a plurality of teeth 60 for receipt of the chain 20. The through bore 58 receives the crankshaft 12 and the axially extending collar 48 of the bearing 34. The drive sprocket/gear 14 is positioned upon the crankshaft 12 so that the first side 52 abuts the wave spring 32, which abuts the crankshaft shoulder 30.

The second side 54 of drive sprocket/gear 14 includes a recessed well 62. Extending radially inward from the recessed well 62 are a number of knobs 64 evenly placed about the well 62. The knobs 64 preferably do not extend beyond the second side 54. While the number of knobs 64 may vary according to the size of the drive sprocket/gear 14, the recessed well 62 preferably includes four knobs 64.

The bumpers 38 may be made of any suitable material capable of absorbing forces exerted upon the bumpers 38, such as rubber or other elastomeric material. The bumpers 38 may further be made of any suitable shape to permit each bumper 38 to sit within the well 62 and to receive at least one of the knobs 64. Preferably, each bumper 38 is comprised of a center portion 66 with two winged portions 68 extending from opposite ends of the center portion 66 to form a recess 70 between the winged portions 68. The recess 70 is sized to receive any one of the knobs 64. The bumpers 38 are placed within the well 62 of the drive sprocket/gear 14 so that the bumpers 38 are securely seated upon the knobs 64 within the well 62.

Seated within the well 62, the bumpers 38 define gaps 72 (FIGS. 4 and 5) between the bumpers 38. The gaps 72 are sized to receive the bosses 50 of the bearing 34. Specifically, the first face 40 of bearing 34 is placed in flush contact with the second side 54 of the drive sprocket/gear 14 so that the axially extending collar 48 is inserted within the through bore 58 of the drive sprocket/gear 14 and the bosses 50 of the bearing 34 are seated within the gaps 72 between the bumpers. The drive sprocket/gear 14 and bearing 34 are held in contact with each other due to the interaction between the bearing 34 and the crankshaft 12, which secures the bearing 34 in place upon the crankshaft 12, and due to the biasing force of spring 32, which supplies a force to drive sprocket/gear 14 in the direction of bearing 34.

With the vibration damper assembly 28 assembled and securely seated upon the crankshaft 12, the damper assembly 28 is capable of reducing the transmission of vibrations between the crankshaft 12 and the balance shaft 16. The damper assembly 28 reduces the transmission of vibrations between the crankshaft 12 and the balance shaft 16 by reducing the transfer of vibrations between the bearing 34 and the drive sprocket/gear 14 as it is the bearing 34 that contacts the crankshaft 12, not the drive sprocket/gear 14 (FIG. 6). A detailed description of the operation of vibration damper assembly 28 is provided below.

As the crankshaft 12 experiences vibration spikes due to the normal operation of the engine 10, especially spikes in torsional vibrations, the vibrations are transferred to the bearing 34 as the bearing 34 is seated directly on the crankshaft 12 (FIG. 6). Advantageously, the friction ring 36 located between the bearing 34 and the drive/sprocket gear 14, and preferably secured to the bearing 34, provides a friction surface to thereby diminish the transfer of vibrations between the bearing 34 and the drive sprocket/gear 14.

The bumpers 38 provide a cushion between the bosses 50 and the knobs 64. Bumpers 38 prevent metal to metal contact between the bosses 50 and the knobs 64 and the undesirable results associated with such contact, such as excessive wear and noise. The bumpers 38 may be sized so that the bosses 50 either remain in constant contact with the bumpers 38 or so that a space exists between the bosses 50 and the bumpers 38 with the bosses 50 engaging the bumpers 38 only when the bosses 50 are rotated into contact with the bumpers 38 due to rotation of the bearing 34 by the crankshaft 12. Finally, depending on the geometry of the bumpers 38, the bumpers 38 also act as nonlinear springs and stops between the bosses 50 and the knobs 64.

Thus, an improved vibration damper assembly 28 is disclosed. The damper assembly 28 generally includes a crankshaft drive sprocket/gear 14, a bearing 34, a friction ring 36, and at least one bumper 38. The bearing 34 is seated directly upon the crankshaft 12 of engine 10 and receives the vibrations of crankshaft 12. Bosses 50 of bearing 34 are received within the well 62 of the drive sprocket/gear 14. Specifically, bosses 50 are seated within gaps 72 formed within well 62 by bumpers 38, which are also seated within well 62. Drive sprocket/gear 14 is seated upon the raised collar 48 of bearing 34 and held in secure contact with bearing 34 due to the presence of wave spring 32. Located between bearing 34 and drive sprocket/gear 14 is the friction ring 36. The wave spring 32 acts to bias the drive sprocket/gear 14 against the friction ring 36. The presence of friction ring 36 dampens vibrations transferred between the bearing 34 and the drive sprocket/gear 14 and the presence of bumpers 38 prevents metal to metal contact between the bosses 50 and the knobs 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vibration damping device for suppressing engine vibrations, said device comprising;

a bearing;

a drive sprocket seated upon said bearing, said drive sprocket comprising:

a first side;

a first side;

at least one knob located at said second side; and at least one bumper disposed on said knob and in engagement with a boss disposed on said bearing; and a friction ring positioned between said bearing and said drive sprocket; and a biasing device, wherein said biasing device applies a force to said drive sprocket to maintain contact between said drive sprocket and said friction ring, and wherein said biasing device is a wave spring.

2. The device of claim 1, wherein said at least one bumper is comprised of rubber.

3. The device of claim 1, wherein said boss on said bearing is seated between two of said bumpers.

4. The device of claim 1, wherein said knob and said bumpers are disposed within a well.

5. A vibration damping system for suppressing vibrations produced by an automobile engine, said system comprised of:

a crankshaft;

a bearing seated upon said crankshaft;

a drive member seated upon said bearing;

a vibration damping mechanism drivingly disposed between said bearing and said drive member;

an engine balance system in cooperation with drive member; and a biasing device seated upon said crankshaft, wherein said biasing device applies a force to said drive member to bias said drive member toward said bearing.

6. The system of claim 5, further comprising at least one knob located on said drive member.

7. The system of claim 5, further comprising at least one bumper disposed on said knob.

8. The system of claim 5, wherein said biasing device is a wave spring.

9. The system of claim 5, wherein said at least one bumper is comprised of rubber.

10. The system of claim 5, further comprising at least one boss extending from said bearing and disposed against said at least one bumper.

11. The system of claim 5, further comprising a balance shaft chain for coupling said drive member and said balance system.

12. The system of claim 5, further comprising a friction ring positioned between said bearing and said drive member.

* * * * *